United States Patent [19]

Ruechardt et al.

[11] 3,862,958

[45] Jan. 28, 1975

[54] MANUFACTURE OF INDAZOLES

[75] Inventors: Christoph Ruechardt, Burghoefen bei Kirchzarten; Volker Hassmann, Muenster; Hans-Juergen Quadbeck-Seeger, Ludwigshafen; Herbert Armbrust, Gruenstadt, all of Germany

[73] Assignee: Badische Anilin- & Soda-Fabrik Aktiengesellschaft, Ludwigshafen/Rhine, Germany

[22] Filed: Nov. 6, 1972

[21] Appl. No.: 304,241

[30] Foreign Application Priority Data
Nov. 9, 1971 Germany.......................... 2155545
Mar. 3, 1972 Germany.......................... 2210169

[52] U.S. Cl............................ 260/310 C, 260/141
[51] Int. Cl............................................. C07d 47/18
[58] Field of Search................................ 260/310 C

[56] References Cited
UNITED STATES PATENTS
3,705,175   12/1972   Macdanyl et al. .............. 260/310 C
FOREIGN PATENTS OR APPLICATIONS
400,169   4/1966   Switzerland..................... 260/310 C

OTHER PUBLICATIONS

Behr In: Wiley et al., Pyrazoles, Pyrazolines, Pyrazolidines, Indazoles and Condensed Rings N.Y., Interscience-Wiley, 1967, page 300.
Elderfield, Heterocyclic Compounds, Vol. 5, pages 171–4, N.Y., Wiley, 1957.
Huisgen et al., Liebigs Annal. Chem., Vol. 586, pages 84–109 (1954).
Simonov et al., Chem. Abst. Vol. 59, col. 10021 (1963).
Simonov et al., II Zhur. Obshch. Khim., Vol. 33, pages 1001–5 1963.

*Primary Examiner*—Natalie Trousof
*Attorney, Agent, or Firm*—Johnston, Keil, Thompson & Shurtleff

[57] ABSTRACT

Preparation of indazoles by reacting o-toluidines with alkyl nitrites, esters of glycols or glycol derivatives with nitrous acid, and/or nitrous gases in the presence of acetic anhydride, an alkali metal salt of an alkanoic acid and an organic solvent followed by elimination of the acetyl group from the 1-acetylindazole formed. The compounds prepared by the process of the invention are valuable intermediates in the manufacture of dyes, pharmaceuticals and pesticides.

12 Claims, No Drawings

MANUFACTURE OF INDAZOLES

This invention relates to a process for the manufacture of indazoles by reacting o-toluidines with alkyl nitrites, esters of glycols or glycol derivatives with nitrous acid, and/or nitrous gases in the presence of acetic anhydride, an alkali metal salt of an alkanoic acid and an organic solvent followed by elimination of the acetyl group from the 1-acetylindazole thus formed.

It is disclosed in Annalen der Chemie, Vol. 586 (1954), pp. 84–109, and in Elderfield, "Heterocyclic Compounds", Vol. 5, pp. 162–192 (J. Wiley, New York, 1957) that substituted o-toluenediazonium salts may be cyclized to form indazoles. The yields are only high when the substituents are electron-attracting (Albert, "Chemie der Heterocyclen" (Verlag Chemie, Weinheim, 1962), pp. 192–193). For example, m-nitro-o-toluenediazonium compounds are cyclized in acetic acid to form 6-nitroindazole (Elderfield, loc. cit., pp. 171 and 172). It is pointed out that the substituent must be a nitro group or a halogen atom. It is also known to treat benz-o-toluidide in acetic acid with nitrous gases and precipitate the resulting nitroso compound with water and then separate it and heat it in benzene to convert it to indazole (Elderfield, loc.cit., page 172; Annalen, loc. cit., page 89). As disclosed in the said article in Annalen (loc. cit., page 85), o-toluenediazonium salts, when in acidic or neutral solution, do not provide indazole but give rise to normal exchange reactions with the elimination of the diazo nitrogen. It is recommended (Annalen, loc. cit., page 90) to nitrosate acet-o-toluidide in a mixture of acetic acid and acetic anhydride, to precipitate the nitroso compound with water, to separate and dry it and then to cyclize it in benzene at 40°C.

All of these processes are complicated and unsatisfactory in operation, in their economics and in their yields of product when carried out on a commercial scale. The above nitroso intermediates are unstable and difficult to isolate and to dry completely, as is necessary for the subsequent cyclizing operation.

It is an object of the present invention to provide a new process for the manufacture of indazole itself and indazoles substituted with electron-repelling substituents, in better yield and purity and in a simpler and more economical manner.

We have found that indazoles of the general formula

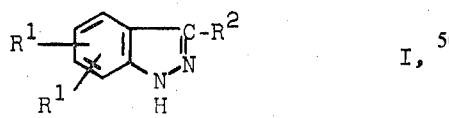

I, wherein the radicals $R^1$, which may be the same or different, are hydrogen, aliphatic, cycloaliphatic, araliphatic or aromatic radicals or halogen, and $R^2$ is hydrogen or an aliphatic radical, are obtained in an advantageous manner if o-toluidines of the general formula

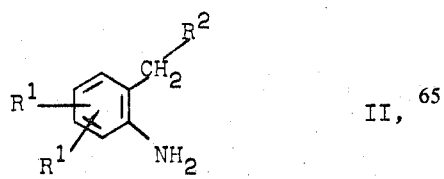

II, where $R^1$ and $R^2$ have the meanings stated, are reacted with alkyl nitrites, esters of glycols or glycol derivatives with nitrous acid, and/or nitrous gases in the presence of acetic anhydride, an alkali metal salt of an alkanoic acid and an organic solvent which is inert under the conditions of the reaction, and the acetyl group is then removed from the resulting 1-acetyl-indazole in known manner.

The reaction may be represented by the following equation illustrating the use of o-toluidine and isoamyl nitrite:

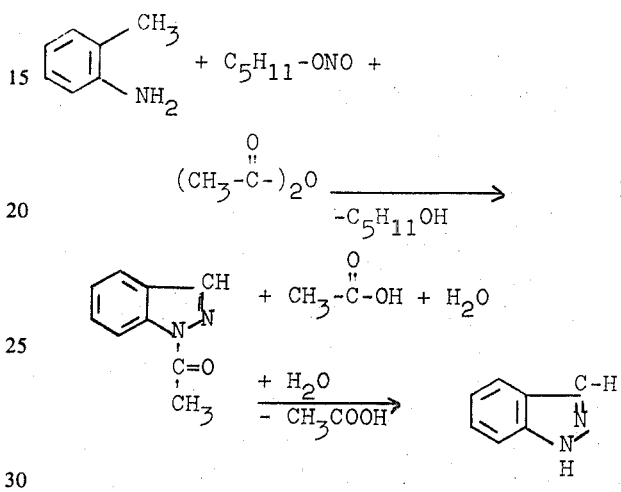

The reaction may also be represented by the following equation illustrating the use of o-tuluidine and the nitrite of glycol monomethyl ether:

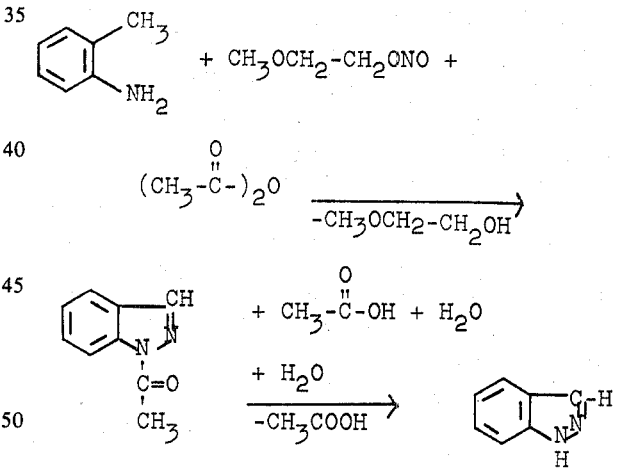

Compared with the prior art processes, the process of the invention provides indazole and indazoles substituted with electron-repelling substituents in surprisingly better yield and purity and in a simpler and more economical manner. There is no complicated and costly preparation and isolation of nitroso derivatives. The simple, single-stage method of cyclization makes the process suitable for use on a commercial scale.

The process of the invention, when using esters of glycol or glycol derivatives with nitrous acid, produces indazoles and substituted indazoles in generally shorter reaction times than when alkyl nitrites and nitrous gases are used.

Preferred starting materials of formula II and accordingly preferred products I are those in the formulae of which the radicals $R^1$, which may be the same or different, are hydrogen, alkyl of from 1 to 6 carbon atoms, cycloalkyl of 5 to 6 carbon atoms, aralkyl of from 7 to 12 carbon atoms, phenyl, chlorine, bromine or iodine and $R^2$ is hydrogen or alkyl of from 1 to 6 carbon atoms. The above radicals may be substituted by groups which are inert under the conditions of the reaction, for example alkyl or alkoxy groups of from 1 to 3 carbon atoms. The radicals $R^1$ are preferably in the 2-, 3- and/or 4-positions in relation to the amino group in starting material II.

Examples of suitable starting materials II are: o-tuluidine, 2-methyl-, 2,3-diisopropyl-, 2-chloro-, 3-chloro-, 4-chloro-, 5-chloro-, 3-phenyl-, 4-ethyl-, 2,4-dichloro-, 3-cyclohexyl-, 2-bromo-, 2-iodo- and 4-benzyl-o-toluidines, o-ethylaniline and o-n-butylaniline.

The reaction is carried out in the presence of acetic anhydride, preferably in an amount of from 100 to 2,300% and in particular from 280 to 860% by weight based on starting material II, and in the presence of an alkali metal salt of an alkanoic acid, preferably in an amount of from 10 to 360% and in particular from 90 to 190% by weight based on starting material II. Preferred salts are the sodium and potassium salts, and suitable acids are those having from 1 to 6 carbon atoms. Specific examples of suitable salts are the sodium and potassium salts of propionic acid, butyric acid, isobutyric acid, valeric acid and capronic acid and, in particular, potassium acetate.

Suitable organic solvents which are inert under the conditions of the reaction are aromatic hydrocarbons such as the xylenes, toluene and, in particular, benzene; aliphatic hydrocarbons such as light petroleum and petroleum ethers, cycloaliphatic hydrocarbons such as cyclohexane, and appropriate mixtures thereof. In general, suitable amounts are from 800 to 25,000% and in particular from 2,000 to 3,000% by weight of solvent, based on starting material II.

Suitable further starting materials are nitrosating agents in the form of alkyl nitrites and preferably in the form of an alkyl nitrite having from 1 to 5 carbon atoms, or in the form of nitrous gases. Specific examples are methyl, ethyl, amyl, isobutyl and, in particular, isoamyl nitrites. By nitrous gases we mean the nitrogen oxides known to be useful as nitrosating agents or diazotizing agents, i.e. nitric oxide, nitrogen dioxide, nitrogen tetroxide and nitrogen trioxide. These gases may be used separately or, preferably, as a suitable mixture, advantageously a mixture of nitric oxide and nitrogen dioxide. In general, amounts of from 1.1 to 5 moles of alkyl nitrite and/or nitrous gases per mole of starting material II and advantageously from 1.1 to 2.7 and more particularly from 1.1 to 1.7 moles of alkyl nitrite or from 1.5 to 5 and more particularly from 2 to 4 moles of $N_2O_3$ per mole of starting material II are suitable. Gases which are inert under the conditions of the reaction, e.g. nitrogen, may be added to said nitrogen oxides or mixtures thereof.

The esters of nitrous acid, which may be used as further starting materials, can be prepared in any desired manner, conveniently by the reaction of glycol or glycol derivatives with nitrous acid or nitrogen oxides. Preferred esters of glycols and glycol derivatives are mono- and di-glycol esters of nitrous acid having the formula $$ONO-R-X \qquad III$$

where R is a radical of the formula $-R^3-O-$ or

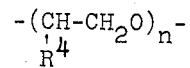

where $R^3$ is an aliphatic radical and $R^4$ is hydrogen or an aliphatic radical, $n$ is one of the numbers 1, 2, 3 and 4 and X is the group $-NO$ or an aliphatic, araliphatic, cycloaliphatic or aromatic radical. Advantageously, $R^3$ is alkylene of from 3 to 12 and in particular from 4 to 9 carbon atoms, $R^4$ is hydrogen or alkyl of from 1 to 4 carbon atoms, in particular methyl, n is one of the numbers 1, 2 and 3 and X is the group $-NO$, alkyl of from 1 to 4 carbon atoms, aralkyl of from 7 to 12 carbon atoms, cyclohexyl, cyclopentyl, phenyl, or alkylcarbonyl of from 2 to 5 carbon atoms, advantageously acetyl. The said alkyl and alkylene radicals may be straight-chain or branched-chain. The above preferred radicals may also be substituted by groups which are inert under the conditions of the reaction, e.g. alkoxy or alkyl each of from 1 to 3 carbon atoms. In general, suitable quantities are from 1.1 to 5 moles of monoglycol ester per mole of starting material II and conveniently from 1.1 to 2.7 and more particularly from 1.1 to 2.2 moles of monoglycol ester per mole of starting material II. Suitable amounts of diglycol esters are accordingly from 0.55 to 2.5 and conveniently from 0.55 to 1.35 and more particularly from 0.55 to 1.1 moles per mole of starting material II. Suitable esters III are for example mono- or di-esters of nitric acid with the following compounds:

$CH_3O-CH_2CH_2-OH$ $C_2H_5O-CH_2CH_2-OH$ $C_3H_7O-CH_2CH_2-OH$ $C_4H_9O-CH_2CH_2OH$ $HO-(CH_2CH_2O)_2H$, $HO-CH(CH_3)-CH_2OCH_2-CH(CH_3)-OH$, $C_2H_5O-(CH(CH_3)-CH_2O)_2H$ $HO-(CH_2CH_2O)_3H$ $CH_3O(CH_2CH_2O)_2H$ $C_2H_5O(CH_2CH_2O)_2H$ $CH_3O-CH_2-CH(CH_3)-OH$ $CH_3O-(CH(CH_3)-CH_2O)_2H$ $CH_3COOCH_2CH_2OH$

Continued

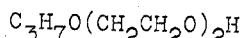

$C_6H_5OCH_2CH_2OH$

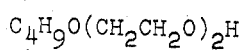

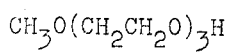

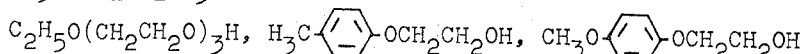

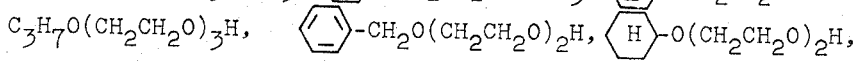

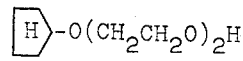

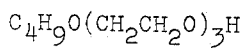

$C_2H_5O(CH_2CH_2O)_4H$; diglycol esters in which R is $-R^3-O-$,

X is $-NO$ and $R^3$ is the alkylene radical $-(CH_2)_3-$, $-(CH_2)_4-$,

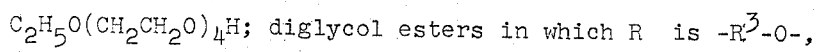

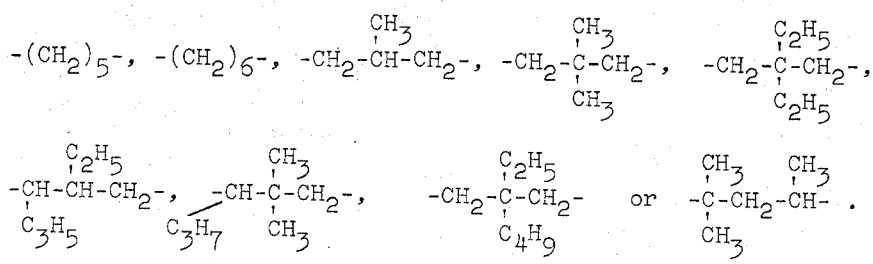

The reaction is usually carried out at a temperature of between 45° and 130°C and preferably of between 60° and 110°C at atmospheric or elevated pressure, continuously or batchwise. For example, the starting materials may be reacted in the following manner: a mixture of starting material II, alkyl nitrite or ester, acetic anhydride, alkali metal salt and solvent is maintained at the reaction temperature for from 12 to 20 hours. The mixture is then filtered and the filtrate evaporated.

The product is present in the filtrate in the form of its 1-acetyl compound. The acetyl group is removed in known manner, conveniently by treatment with acid in an amount of, say, from 2 to 10 moles per mole of 1-acetyl compound for from 30 to 90 minutes at from 40° to 60°C. In the case of chloroindazoles the temperature used in conveniently from 60° to 70°C and, if necessary, slightly higher amounts of acid are used for the saponification. Advantageously, 15 to 38% w/w hydrochloric acid is used. However, elimination of the acetyl group may be carried out with other acids, such as 48% w/w sulfuric acid, 64% w/w phosphoric acid or 33% w/w nitric acid.

After the elimination of the acetyl group, the product is isolated in conventional manner, for example by extracting the mixture with benzene, extracting the benzene extract with hydrochloric acid, supersaturating the hydorchloric acid extract with ammonia and filtering.

If, in place of alkyl nitrite, nitrous gases are used, one of the said nitrogen oxides or mixtures thereof, usually $N_2O_3$, may be passed, optionally together with inert gas, continuously or intermittently through the starting mixture at the reaction temperature over a period of from 90 minutes to 4 hours, the reaction then being carried out for from 30 to 90 minutes followed by isolation of the product in the manner described above.

The compounds prepared by the process of the invention are valuable intermediates in the manufacture of dyes, pharmaceuticals and pesticides. For example, valuable azo dyes may be obtained by coupling (Bamberger, Annalen, 305, pp. 298, 299 and 343; Belgian Patent 623,968).

In the following Examples the parts are by weight unless otherwise stated. The parts by weight relate to the parts by volume as do kilograms to liters.

EXAMPLE 1

Isoamyl nitrite as diazotizing agent 3.51 parts of isoamyl nitrite are added to a suspension of 2.14 parts of distilled o-toluidine and 2.0 parts of anhydrous potassium acetate in 6.13 parts of acetic anhydride and 60 parts by volume of benzene over a period of 30 minutes. The reaction solution is held at from 80° to 85°C with constant stirring. After a reaction period of 18 hours, during which the solution takes on an orange-red color, the cooled reaction solution is filtered to remove the potassium acetate, which is washed a number of times with benzene. The combined filtrates are evaporated at 40°C in a rotary evaporator, and a mixture of 10 parts by volume of 5N hydrochloric acid and 5 parts by volume of concentrated hydrochloric acid is slowly added to eliminate the acetyl group. The mixture is then stirred at from 45° to 50°C for 1 hour and heated to 55°C for a short period. The reaction solution is shaken with 55 parts by volume of benzene and the benzene phase is then extracted with 1 × 10 parts by volume of 2N hydrochloric acid and 2 × 5 parts by volume of 5N hydrochloric acid. The acid extracts are treated with from 10 to 15 parts by volume of concentrated ammonia to separate the indazole. After standing for 2 hours in an ice bath, the product is filtered off, washed with cold water and dried in vacuo over concentrated sulfuric acid. The yield is 1.86 parts (78.5% of theory) of indazole, m.p. 147.5° to 148.0°C.

If the reaction is carried out in solvents other than benzene, the yields of indazole are as given in Table I below.

TABLE I

| Solvent | Temp. °C | Reaction time hrs | Yield % | m.p. °C |
|---|---|---|---|---|
| cyclohexane | 80 | 20 | 68 | 146–147 |
| light petroleum | 80 | 20 | 60 | 144–145 |
| petroleum ether | 45 | 48 | 51 | 147–148 |

EXAMPLES 2 TO 8

Example 1 is repeated except that the following starting materials II are used:

| Example | Starting material II | Parts |
|---|---|---|
| 2 | 3-methyl-6-aminotoluene | 2.42 |
| 3 | 4-methyl-6-aminotoluene | 2.42 |
| 4 | 5-methyl-6-aminotoluene | 2.42 |
| 5 | 2-chloro-6-aminotoluene | 2.82 |
| 6 | 3-chloro-6-aminotoluene | 2.82 |
| 7 | 4-chloro-6-aminotoluene | 2.82 |
| 8 | 5-chloro-6-aminotoluene | 2.82 |

The saponification temperature in Examples 5 to 8 is from 60° to 70°C and the acid used is 10 parts by volume of concentrated hydrochloric acid mixed with 5 parts by volume of 5N hydrochloric acid. The results are listed in Table II below.

TABLE II

| Ex. | Indazole product | Parts | Yield in % of theory | m.p. (°C) |
|---|---|---|---|---|
| 2 | 5-methylindazole | 1.71 | 64.8 | 114–116 |
| 3 | 3-methylindazole | 1.82 | 68.9 | 175–176 |
| 4 | 7-methylindazole | 1.45 | 54.9 | 134–135 |
| 5 | 4-chloroindazole | 2.53 | 83.0 | 155–156 |
| 6 | 5-chloroindazole | 2.46 | 80.8 | 114–116 |
| 7 | 6-chloroindazole | 2.51 | 82.4 | 174–176 |
| 8 | 7-chloroindazole | 1.66 | 54.5 | 135–136 |

EXAMPLE 9

Nitrous gases as nitrosating agent 2.14 parts of distilled o-toluidine are added to a suspension of 4.0 parts of anhydrous potassium acetate in 9.2 parts of acetic anhydride and 60 parts by volume of benzene. The reaction solution is maintained at from 80° to 85°C over 3 hours with constant stirring. During this period, 100 parts of nitrous gases generated from sodium nitrite and concentrated nitric acid in a closed reaction vessel are passed through the reaction solution in admixture with nitrogen as carrier gas. After a total reaction time of 4 hours the solution has assumed a reddish brown color. This reaction solution is then worked up as described in Example 1. The yield of crude indazole is 1.47 parts (62.0% of theory), its melting range being from 110° to 135°C. If the product is sublimated at an oil bath temperature of 80°C and a pressure of 0.05 mm of Hg, the yield is 1.13 parts of indazole (47.5% of theory) having a melting range of from 144° to 147°C.

EXAMPLES 10 TO 12

The following reactions are carried out in the manner described in Example 9 and the results are given in Table III.

TABLE III

| Ex. | Starting material | Parts | Indazole product | Parts | Yield in % of theory | m.p. °C |
|---|---|---|---|---|---|---|
| 10 | 2-chloro-6-amino-toluene | 2.82 | 4-chloro-indazole | 2.32 | 76.1 | 155.5–156 |
| 11 | 3-chloro-6-amino-toluene | 2.82 | 5-chloro-indazole | 1.90 | 62.4 | 114.5–116 |
| 12 | 4-chloro-6-amino-toluene | 2.82 | 6-chloro-indazole | 1.76 | 57.5 | 174–176 |

EXAMPLES 13 TO 14

In Table IV below, the reaction given in Example 13 is carried out with isoamyl nitrite in a manner similar to that described in Example 1, and the reaction given in Example 14 is carried out with nitrous gases and $N_2$

TABLE IV

| Ex. | Starting material | Parts | Product | Parts | Yield in % of theory | m.p. °C |
|---|---|---|---|---|---|---|
| 13 | o-ethylaniline | 2.42 | 3-methyl-indazole | 1.44 | 54.6 | 109–111 |
| 14 | o-ethylaniline | 2.42 | 3-methyl-indazole | 0.88 | 33.4 | 108–110 | as carrier gas in a manner similar to that described in Example 9.

EXAMPLE 15

3.9 parts of diisopropyldiglycol dinitrite are added at 80° to 85°C to a mixture of 2.14 parts of o-toluidine, 8 parts of acetic anhydride, 2 parts of anhydrous potassium acetate and 60 parts by volume of dry benzene. The mixture is stirred under reflux for 30 minutes and then cooled and filtered. The precipitate, which substantially consists of potassium acetate, is washed a number of times with benzene. The combined filtrates are evaporated in vacuo below 40°C and to the residue there are added 10 parts by volume of 5N hydrochloric acid and 5 parts by volume of concentrated hydrochloric acid, this mixture then being stirred for 45 minutes at 45° to 50°C and, after the addition of a little activated charcoal, the mixture is filtered. The filtrate is cooled, and 25% w/w aqueous ammonia is added until the mixture is alkaline, after which the mixture is filtered and the product is dried to give 2.19 parts of crude indazole. This is purified by sublimation at 0.1 mm of Hg and 80°C to give 1.82 parts of indazole having a melting range of from 144° to 146°C (77.2% of theory). If the reaction is carried out in solvents other than benzene, the indazole yields given in Table V are obtained.

TABLE V

| Solvent | Temperature | Reaction time hrs | Yield in % of theory | m.p. °C |
|---|---|---|---|---|
| cyclohexane | 80 | 30 | 70 | 143–144 |
| light petroleum | 80 | 30 | 58 | 146–147 |
| petroleum ether | 45 | 65 | 52 | 143–144 |

EXAMPLES 16 TO 22

Example 15 is repeated except that the following starting materials are used.

| Example | Starting material | Parts |
|---|---|---|
| 16 | 3-methyl-6-aminotoluene | 2.42 |
| 17 | 4-methyl-6-aminotoluene | 2.42 |
| 18 | 5-methyl-6-aminotoluene | 2.42 |
| 19 | 2-chloro-6-aminotoluene | 2.82 |
| 20 | 3-chloro-6-aminotoluene | 2.82 |
| 21 | 4-chloro-6-aminotoluene | 2.82 |
| 22 | 5-chloro-6-aminotoluene | 2.82 |

The saponification temperature in Examples 19 to 22 is 60°C to 70°C and the acid used is a mixture of 10 parts by volume of concentrated hydrochloric acid and 5 parts by volume of 5N hydrochloric acid. The results are listed in Table VI below.

TABLE VI

| Ex. | Indazole product | Yield in % of theory | m.p. in °C |
|---|---|---|---|
| 16 | 5-methylindazole | 63 | 112–114 |
| 17 | 6-methylindazole | 69 | 175–176 |
| 18 | 7-methylindazole | 57 | 133–135 |
| 19 | 4-chloroindazole | 79 | 152–154 |
| 20 | 5-chloroindazole | 73 | 115–116 |
| 21 | 6-chloroindazole | 78 | 173–174 |
| 22 | 7-chloroindazole | 61 | 134–135 |

EXAMPLES 23 TO 31

Example 15 is repeated except that the following mono- and di-esters of nitrous acid with glycols and glycol derivatives are reacted with o-toluidine to give the indazole yields listed in Table VII below.

TABLE VII

| Ex. | Parts of ester used | Glycol moiety of ester used | Yield of indazole in % of theory |
|---|---|---|---|
| 23 | 3.3 | diethyleneglycol (diester) | 75 |
| 24 | 5.7 | diethyleneglycol monomethylether | 63 |
| 25 | 4.3 | ethyleneglycol monomethylether | 67 |
| 26 | 8.3 | triethyleneglycol monoethylether | 57 |
| 27 | 5.5 | ethyleneglycol monoacetate | 52 |
| 28 | 5.7 | ethyleneglycol monopropylether | 65 |
| 29 | 6.0 | ethyleneglycol monobutylether | 66 |
| 30 | 3.0 | butanediol-1,4 (diester) | 71 |
| 31 | 4.2 | triethyleneglycol (diester) | 54 |

We claim:
1. A process for the manufacture of an indazole of the formula

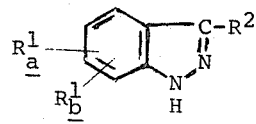

wherein
$R_a^1$ and $R_b^1$ each is hydrogen, alkyl of from 1 to 6 carbon atoms, benzyl, chlorine, bromine or iodine, and $R^2$ is hydrogen or alkyl of from 1 to 6 carbon atoms, with the proviso that the $R^1$ and $R^2$ radicals may bear an inert substituent selected from the group consisting of alkyl and alkoxy each of from 1 to 3 carbon atoms, which process comprises reacting at a temperature of between 45° and 130° C. an o-toluidine of the formula

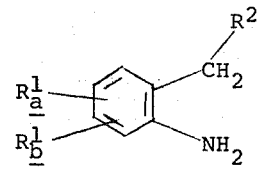

where $R_a^1$, $R_b^1$ and $R^2$ have the meanings stated, with a nitrosating agent selected from the class consisting of
nitrous gases,
alkyl nitrites having from 1 to 5 carbon atoms, and
esters of glycols or glycol derivatives with nitrous acid having the formula

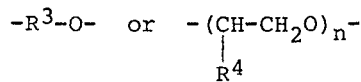

where R is a radical of the formula $$-R^3-O- \text{ or } -(\underset{R^4}{CH}-CH_2O)_n-$$

where R3 is alkylene of from 3 to 12 carbon atoms, R⁴ is hydrogen or alkyl of from 1 to 4 carbon atoms, *n* is one of the numbers 1, 2, 3 or 4 and X is —NO, alkyl of from 1 to 4 carbon atoms, aralkyl of from 7 to 12 carbon atoms, cyclohexyl, cyclopentyl, phenyl, or alkylcarbonyl of from 2 to 5 carbon atoms, with the proviso that all of said radicals represented by R³, R⁴ and X may bear an inert substituent selected from the group consisting of alkoxy and alkyl each of from 1 to 3 carbon atoms, said reaction being carried out in the presence of acetic anhydride, an alkali metal salt of an alkanoic acid having from 1 to 6 carbon atoms and an organic solvent which is inert under the conditions of the reaction.

2. A process as claimed in claim 1, wherein the reaction is carried out in the presence of acetic anhydride in a concentration of from 100 to 2,300% by weight based on starting material II.

3. A process as claimed in claim 1, wherein the reaction is carried out in the presence of an alkali metal salt of an alkanoic acid in a concentration of from 10 to 360% by weight based on starting material II.

4. A process as claimed in claim 1, wherein the reaction is carried out in the presence of sodium or potassium salts of acids having from 1 to 6 carbon atoms.

5. A process as claimed in claim 1, wherein the reaction is carried out in the presence of organic solvents which are inert under the conditions of the reaction and which are present in a concentration of from 800 to 25,000% by weight based on starting material II.

6. A process as claimed in claim 1, wherein the reaction is carried out using an alkyl nitrite having from 1 to 5 carbon atoms.

7. A process as claimed in claim 1, wherein the reaction is carried out using from 1.1 to 5 moles of alkyl nitrite and/or nitrous gases per mole of starting material II.

8. A process as claimed in claim 1, wherein the reaction is carried out using from 1.1 to 2.7 moles of alkyl nitrite per mole of starting material II.

9. A process as claimed in claim 1, wherein the reaction is carried out using from 1.5 to 5 moles of $N_2O_3$ per mole of starting material II.

10. A process as claimed in claim 1, wherein the reaction is carried out at a temperature of between 60° and 110°C.

11. A process as claimed in claim 1, wherein the reaction is carried out using from 1.1 to 5 moles of monoglycol esters per mole of starting material II.

12. A process as claimed in claim 1, wherein the reaction is carried out using from 0.55 to 2.5 moles of diglycol esters per mole of starting material II.

* * * * *